US012350692B2

(12) United States Patent
Beranger

(10) Patent No.: US 12,350,692 B2
(45) Date of Patent: Jul. 8, 2025

(54) FLUID PRODUCT DISPENSER

(71) Applicant: APTAR FRANCE SAS, Le Neubourg (FR)

(72) Inventor: Stéphane Beranger, Surtauville (FR)

(73) Assignee: APTAR FRANCE SAS, Le Neubourg (FR)

( * ) Notice: Subject to any disclaimer, the term of this patent is extended or adjusted under 35 U.S.C. 154(b) by 207 days.

(21) Appl. No.: 18/013,840

(22) PCT Filed: Jul. 2, 2021

(86) PCT No.: PCT/FR2021/051219
§ 371 (c)(1),
(2) Date: Dec. 29, 2022

(87) PCT Pub. No.: WO2022/003304
PCT Pub. Date: Jan. 6, 2022

(65) Prior Publication Data

US 2023/0286001 A1 Sep. 14, 2023

(30) Foreign Application Priority Data

Jul. 3, 2020 (FR) ....................................... 2007085

(51) Int. Cl.
*B05B 11/00* (2023.01)
*B05B 11/10* (2023.01)
*B05B 15/30* (2018.01)

(52) U.S. Cl.
CPC ...... *B05B 11/0097* (2013.01); *B05B 11/1047* (2023.01); *B05B 15/30* (2018.02)

(58) Field of Classification Search
CPC .. B05B 11/0097; B05B 11/1047; B05B 15/30
See application file for complete search history.

(56) References Cited

U.S. PATENT DOCUMENTS 4,154,369 A * 5/1979 Morane .................... B05B 15/30 215/16
5,343,901 A * 9/1994 Meshberg ........... B05B 11/0097 141/2

FOREIGN PATENT DOCUMENTS

| | | | | |
|---|---|---|---|---|
| EP | 2 409 774 A2 | 1/2012 | | |
| FR | 2 377 946 A1 | 8/1978 | | |
| WO | WO-2014085875 A1 * | 6/2014 | ............. | A45D 34/02 |

OTHER PUBLICATIONS

International Preliminary Report on Patentability dated Dec. 13, 2022 with a Translation of the Written Opinion of the International Searching Authority in Application No. PCT/FR2021/051219.

(Continued)

*Primary Examiner* — Donnell A Long
(74) *Attorney, Agent, or Firm* — Sughrue Mion, PLLC

(57) ABSTRACT

Disclosed is a refillable fluid product dispenser comprising:
a fluid product reservoir (R) defining a neck (R2);
a dispensing member (P) that is mounted on the neck (R2) and comprising an inlet (P2);
and a fastening member (2, 2) for fastening the dispensing member (P) onto the neck (R2);
a dip tube (D) that is connected to the inlet (P2) of the dispensing member (P) and extends into the reservoir (R);
the dispenser being characterised in that the dip tube (D) is secured to the fluid product reservoir (R) by means of a support (1) that forms at least one filling window (15) communicating directly with the inside of the fluid product reservoir (R), the fastening member (2, 3) enabling withdrawal of the dispensing member (P), thus providing access to the support (1) in order to fill the fluid product reservoir (R) through said at least one filling window (15).

18 Claims, 4 Drawing Sheets

(56) References Cited

OTHER PUBLICATIONS

International Search Report for PCT/FR2021/051219 dated Oct. 18, 2021 [PCT/ISA/210].

* cited by examiner

FLUID PRODUCT DISPENSER

CROSS REFERENCE TO RELATED APPLICATIONS

This application is a National Stage of International Application No. PCT/FR2021/051219 filed Jul. 2, 2021, claiming priority based on French Patent Application No. 2007085 filed Jul. 3, 2020.

The present invention relates to a refillable fluid product dispenser comprising a fluid product reservoir that defines a neck, a dispensing member, such as a pump, that is mounted on the neck of the fluid product reservoir for taking up the fluid product, a fastening member for fastening the dispensing member to the neck of the fluid product reservoir, and a dip tube that is connected to the inlet of the dispensing member and that extends into the fluid product reservoir.

The advantageous field of application of the present invention is the field of perfumery, without forgetting the fields of cosmetics and pharmacy.

In the prior art, many refillable dispensers are already known, which are often referred to as "nomadic dispenser". They comprise a reservoir of reduced volume, of about 5 ml to 20 ml, and can be filled by means of a source of fluid product capable of injecting the fluid product under pressure through a filling valve. The source generally comprises a valve rod that is applied against the outer edge of the filling orifice. Each time the valve rod pushes against the filling orifice, a dose of the fluid product is injected.

At the end of the filling operation, the valve rod is moved away from the filling valve, but a small quantity of fluid product remains present. Sometimes a small drop may become separated from it. This residual fluid product may then contaminate an object brought into contact with the filling orifice or onto which the small drop will fall.

There is therefore a cleanliness problem for the filling orifice with such nomadic dispensers. Moreover, this is one of the main reasons why they are not even more commercially available. No user intends to get perfume on their personal items, in particular, items in handbags, bearing in mind that nomadic dispensers are often carried in handbags.

The present invention aims to propose another type of refillable dispenser that does not comprise a filling valve. The filling operation must be intuitive, quick and without any risk of soiling.

To do this, the present invention proposes that the dip tube is secured to the fluid product reservoir by means of a support that forms at least one filling window that communicates directly with the inside of the fluid product reservoir. With regard to the fastening member, it allows the dispensing member to be withdrawn so as to provide access to the support in order to fill the fluid product reservoir through said at least one filling window. The support is integrated in a fixed portion mounted on the fluid product reservoir and the dispensing member is integral with a movable portion that is removably mounted on the fixed portion. Thus, the movable portion is removably mounted on the fixed portion independently of the neck of the reservoir.

Advantageously, the fixed portion comprises a fastening ring forming first removable fastening means which co-operate with second removable fastening means formed by the movable portion.

According to another aspect of the invention, the fastening ring may hold a pump seal on the support. The function of the pump seal is to provide sealing between the fixed and movable portions.

According to a practical embodiment, the support may form a catching skirt engaging around the neck, the fastening ring locking the catching skirt around the neck. In a variant, the fastening ring may directly engage with the neck and hold the support in the neck.

Given that the dip tube remains in place in the reservoir, there is no risk of it to soil. Indeed, it is especially the dip tube that is likely to lose some fluid product once it has been removed from the reservoir. It is dipped into the fluid product and is filled with fluid product. The pump, once removed, can easily be placed onto a surface without it becoming soiled: it can be placed upside down on the pusher, if this is possible. Filling does not take place through the dip tube, but through the filling window(s), which preferably have an increased flow section, in order to avoid causing any overrun, and then overflow.

Advantageously, the support may form at least one vent window to allow air to escape from the fluid product reservoir, when it is filled with fluid. Thus, the flows of fluid product and air intersect in the support. Different configurations for filling and venting windows may impose the nature of the flow passing through them. In general, the fluid product tends to require a window which offers it the least head loss, and the air is then constrained to escape through the other window which has a greater head loss. Preferably, said at least one filling window and said at least one vent window are located at the same axial height. Thus, the filling stops whenever the air can no longer leave the reservoir.

Advantageously, the support may form a sealed connection endpiece in which the inlet of the dispensing member is engaged, the dip tube being in fluid communication with the sealed connector endpiece. The sealed connector endpiece may be movable between an extended rest position and a retracted engaged position, elastic means urging the sealed connector endpiece into the extended rest position, so that the sealed connector endpiece, in the retracted engaged position, is urged elastically against the inlet of the dispensing member. Such elasticity also makes it possible to mount pumps of different sizes (lengths). Such elasticity can also be used to vary the size of the filling and venting windows. Their flow section may be at its maximum in the retracted engaged position and at its minimum in the extended rest position. According to a practical embodiment, the support may comprise a peripheral body in which the sealed connector endpiece slides against the elastic means. In the retracted engaged position, the sealed connector endpiece may or may not seal the filling and venting windows in a sealed manner. It is thus possible to provide a filling source which is inserted into the support so that the sealed connector endpiece is pushed back into the retracted engaged position.

According to another characteristic of the invention, the support may comprise an annular support plate extending above the neck and supporting a pump seal. Advantageously, a neck seal is compressed between the annular support plate and the neck. Advantageously, the pump seal may be held in place on the annular support plate by a fastening ring that extends around the neck. Preferably, the fastening ring comprises an inwardly-directed rim that engages the outer periphery of the pump seal. Furthermore, the fastening ring may form first removable fastening means which co-operate with second removable fastening means formed by the movable portion.

In a practical embodiment, the support may comprise a peripheral body, a transition section, a sealed connector endpiece, and a connection sleeve, the peripheral body and/or the transition section forming the filling window and the vent window, the sealed connector endpiece receiving the inlet of the dispensing member, and the connection sleeve receiving the dip tube, the sealed connector endpiece advantageously being movable relative to the connection sleeve by masking/unmasking the filling and vent windows.

The spirit of the invention resides in separating the dip tube from the pump or the valve in order to leave it in the reservoir, such that the risks of soiling with the pump or valve alone are reduced. Filling is done by gravity or injection through one or more filling windows, but not through the dip tube. The fastening ring and the pump seal provide a stable and sealed mounting of a source reservoir for filling the reservoir, or another device for taking up the contents of the filled reservoir. However, the fastening ring may be implemented without the pump seal and vice versa. But preferably, they are implemented jointly.

The invention will now be described in more detail with reference to the accompanying drawings, which show several embodiments of the invention as non-limiting examples.

Figure 6A:
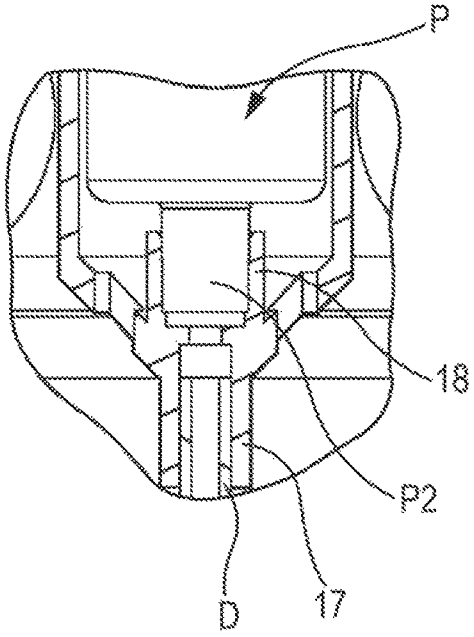
Figure 6B:
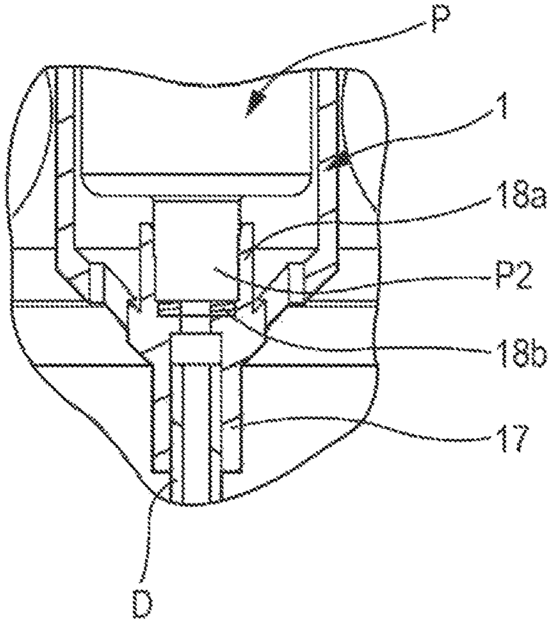
Figure 7A:
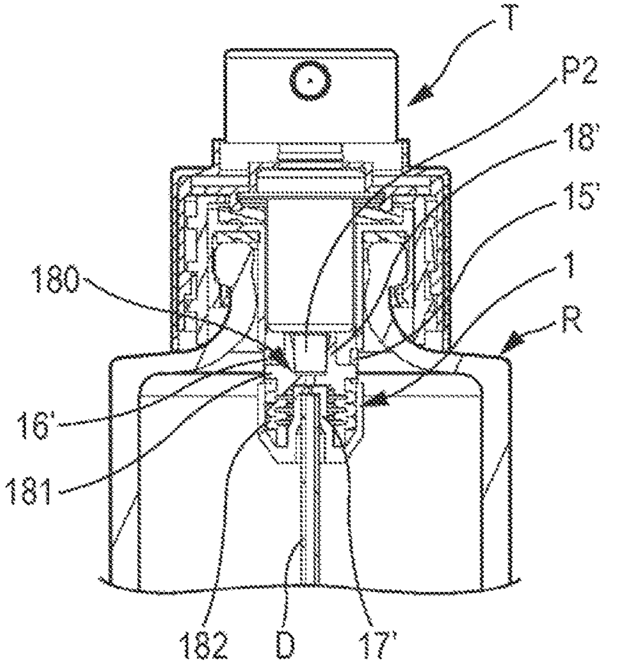
Figure 7B:
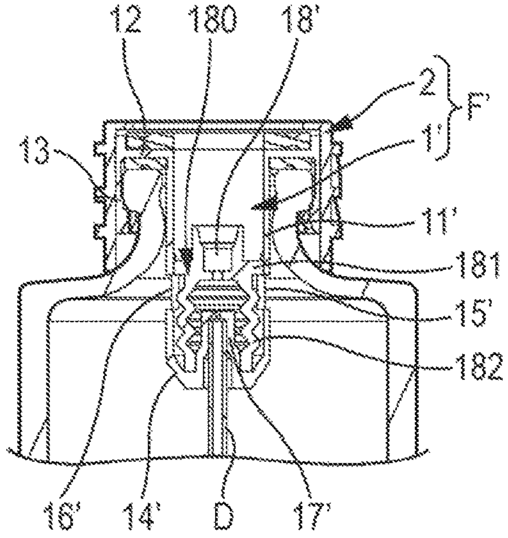
Figure 8:
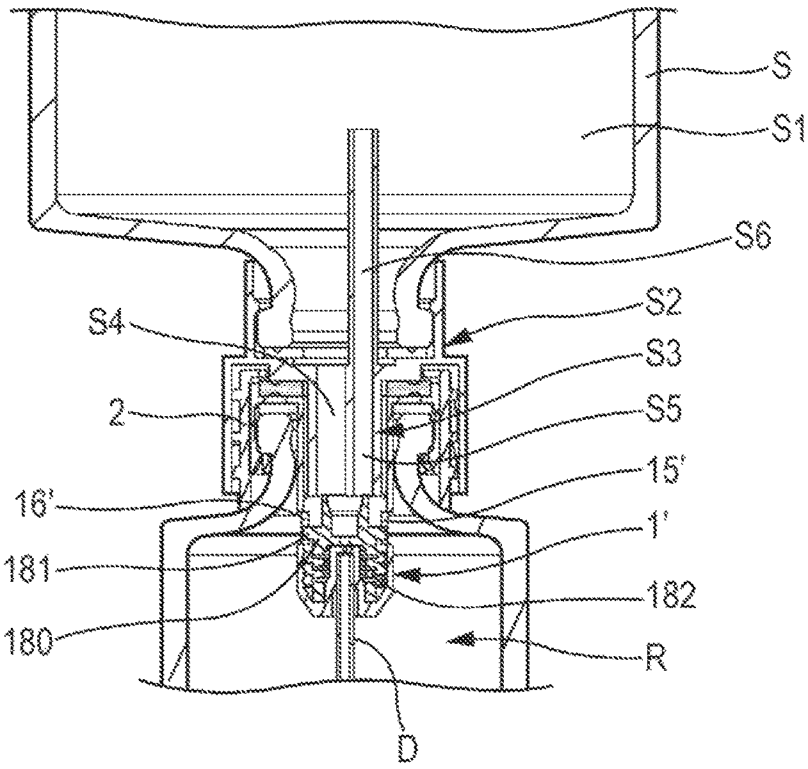

FIGS. 6*a* and 6*b* are views showing two variant embodiments;

FIG. 7*a* is a transverse cross-sectional view through a dispenser according to a second embodiment of the invention, in the mounted state;

FIG. 7*b* is a view similar to the view in FIG. 7*a*, in the dismounted state; and FIG. 8 is a view similar to the view in FIG. 7, with a filling source instead of the dispensing head.

The dispenser of the invention comprises two separable sub-assemblies, namely a first sub-assembly comprising a fluid product reservoir R and a fixed portion F mounted on the reservoir R and a second sub-assembly consisting of a dispensing head T comprising a dispensing member P, a pusher B and a movable portion M serving to removably mount the dispensing member P on the fixed portion F of the first sub-assembly. In other words, the dispensing head T may be removed from the first sub-assembly by means of a simple and rapid action, causing the movable portion M to be separated from the fixed portion F. The removable connection between these two portions can be ensured by any appropriate means, such as screwing/unscrewing, magnetisation, snap-fastening, bayonet fastening, etc.

The fluid product reservoir R is not critical for the invention. It may be made with any appropriate material and may be in any shape. It suffices if it forms a neck R2 which defines an opening. The neck R2 may project from a shoulder R1. The neck R2 may comprise an external annular reinforcement R3 which may be used for fastening.

The fixed portion F essentially comprises a support 1 supporting a dip tube D and a fastening ring 2 which performs two functions, namely holding the support 1 on or in the neck R2 and the removable connection with the removable portion M.

Figure 1:
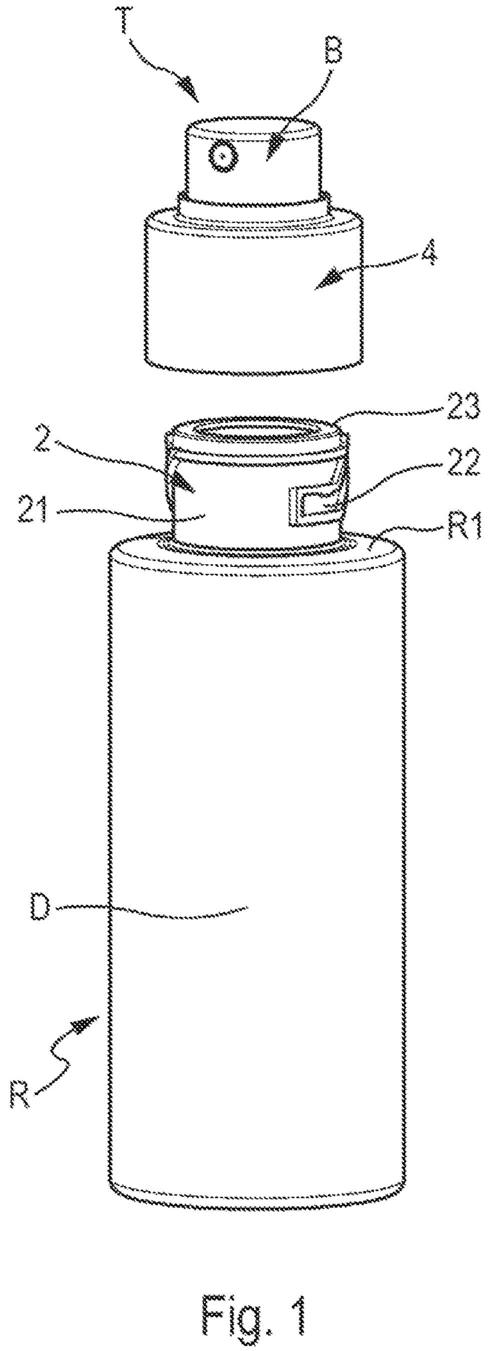
FIG. 1 is a transparent perspective view of a dispenser according to a first embodiment of the invention in its dismounted state.
Figure 2:
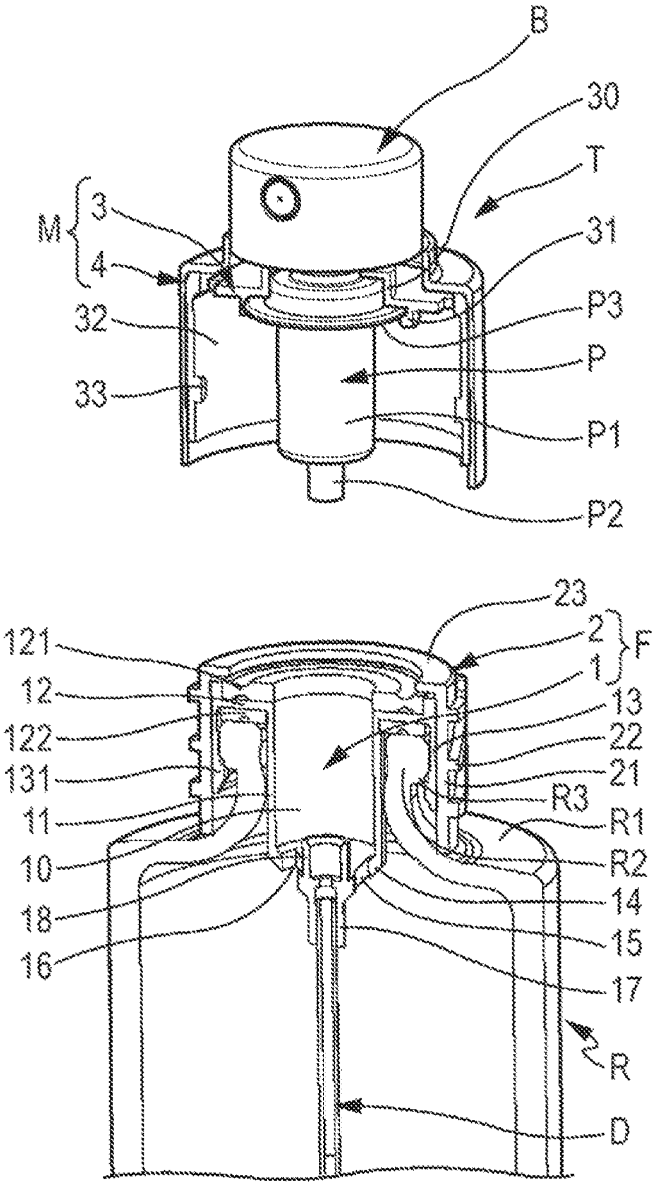
FIG. 2 is a cross-sectional perspective view of the dispenser in FIG. 1.
Figure 3:
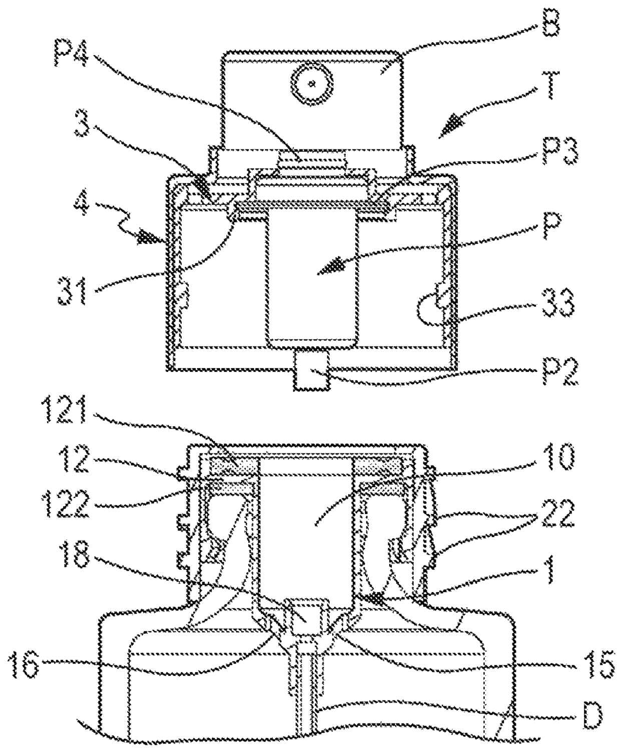
FIG. 3 is a transverse cross-sectional view of the dispenser in FIGS. 1 and 2.

The support 1 is an essential component of the invention. It is used, firstly, to suspend the dip tube D inside the reservoir R, as can be seen in FIG. 2. It is also used to fill the reservoir with fluid product, since the fluid product is poured into the support 1. It may be made by injection-moulding a plastics material.

The support 1 is preferably made as a single part. It comprises a cylindrical peripheral body 11, defining internally a housing for receiving the dispensing member P, as described below. This body 11 is extended at its upper end by an annular support plate 12 that extends radially outwards. This plate 12 is arranged above the annular upper edge of the neck R2, with a neck seal 122 possibly compressed between them. The plate 12 thus defines a lower annular sealing bearing surface that comes into leaktight contact with the fluid product reservoir. This plate 12 may also be provided on its upper face with a pump seal 121. The plate 12 thus defines an upper annular sealing bearing surface that comes into leaktight contact with the dispensing head T, as described below.

At its outer periphery, the plate 12 is extended by a catching skirt 13 that comes into engagement around the neck R2. The skirt 13 may be slotted vertically or, on the contrary, it may be continuous. The skirt 13 may form projecting internal profiles 131 which are housed below the reinforcement R3 of the neck R2.

The body 11 is extended at its lower end by a transition section 14, in this case, frustoconical in shape. It is perforated by a plurality of windows 15, 16, at least one of which is a filling window 15 and at least one of which is a vent window 16. The windows 15 and 16 may be identical or different in cross-section and/or length. They are preferably arranged at the same axial height, in order to stop the filling, whenever the air can no longer escape from the reservoir through the vent window(s) 16.

The transition section 14 is connected downwards to a connection sleeve 17 and upwards to a sealed connector endpiece 18. The connection sleeve 17 and the sealed connector endpiece 18 are aligned and communicate with each other. The dip tube D is force-fitted into the connection sleeve 17. The sealed connector endpiece 18 is adapted to receive the inlet P2 of the dispensing member P, as described below.

The support 1 defines an internal housing 10, mainly formed by the body 11. This internal housing 10 is wide open at the top and partially closed at the bottom by the transition section 14 and the sealed connector endpiece 18.

The fastening ring 2 comprises a casing 21, which is internally cylindrical so that it can engage around the skirt 13 of the support 1. The casing 21 is lowered around the skirt, so as to block its projecting profiles 131 under the reinforcement R3 and to compress the neck seal 122 between the plate 12 and the upper edge of the neck R2. On the outside, the casing 21 forms the first removable fastening means 22, which may be in the form of screw threads or camways. At its upper end, the fastening ring 2 comprises an inwardly-directed rim 23 that engages the outer periphery of the pump seal 121. Thus, the support 1 is mounted in stationary and leaktight manner on the neck R2. In a variant that is not shown, the support 1 may have no skirt 13, and the fastening ring 2 may be provided with fastening means (snap-fastening, screwing, crimping, etc.) which are in direct engagement with the neck R2. In both cases, the fastening ring 2 extends around the neck R2 and holds the pump seal 121 in place on the plate 12 at its outer periphery.

In addition, the body 11, instead of being full, may be perforated over all or part of its height, thus forming filling and venting windows instead of or in addition to those of the transition section 14. Furthermore, the dip tube D may be integral with the connection sleeve 17. The seals 121 and 122 may also be omitted. In this case, the plate 12 would directly form the lower and upper annular sealing surfaces, for example with deformable sealing beads or rings.

The dispensing member P of the dispensing head T may be a conventional pump or valve. It comprises a base body P1 that forms an inlet P2 at its lower end and a fastening collar P3 at its upper end. The dispensing member P also comprises an actuation rod P4 which moves back and forth inside the body P1. This rod P4 is covered by a pusher B, on which the user can press in order to actuate the dispensing member P. This is an entirely conventional design for a pump or a valve in the fields of perfumery and cosmetics.

The movable portion M comprises a capsule 3 forming a housing 30 for receiving the base body P1 of the dispensing member P. This housing 30 comprises an annular snap-fastening flange 31 which engages around and below the fastening collar P3 of the dispensing member P. The capsule 3 also comprises a connection socket 32 which forms second removable fastening means 33, for example in the form of one or more studs which project inwards.

Optionally, the cap 3 may be masked with a covering collar 4, which only fulfils an aesthetic function.

Figure 4:
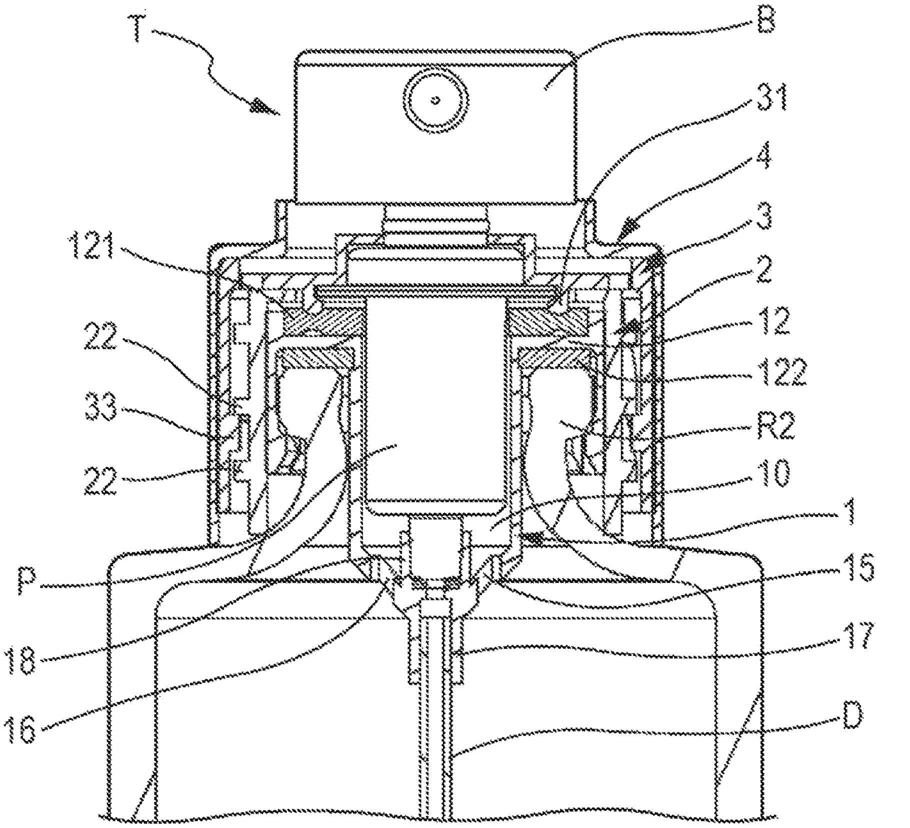
FIG. 4 is a view similar to the view in FIG. 2 of the dispenser, in the mounted state.
Figure 5:
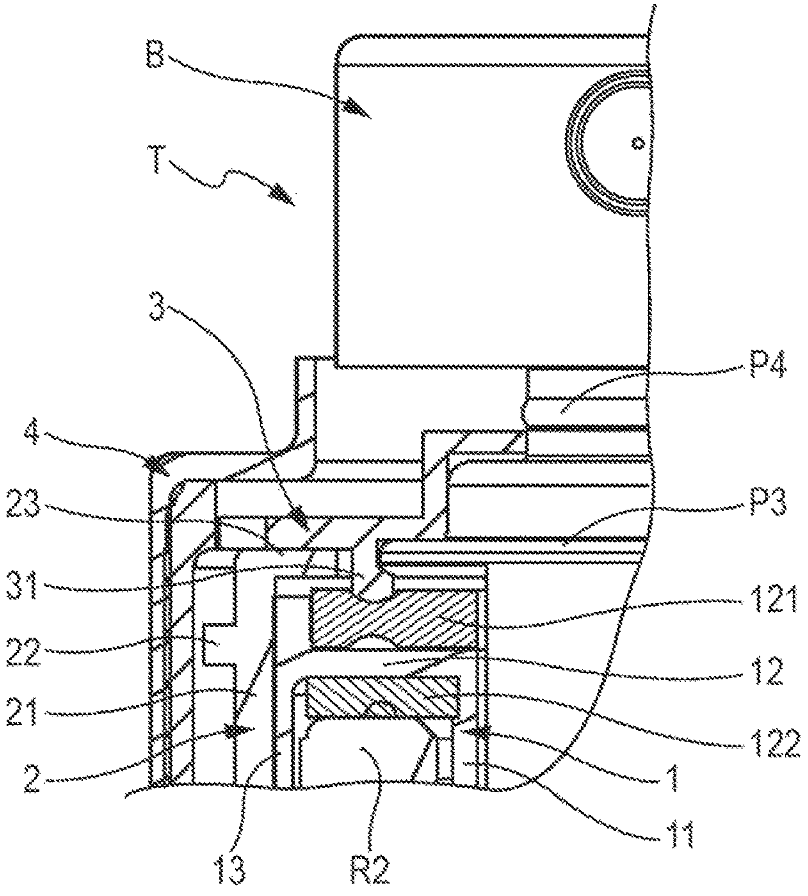
FIG. 5 is a greatly enlarged view of the dispenser in FIG. 4.

As can be seen in FIGS. 4 and 5, the dispensing head T can be mounted on the sub-assembly formed by the reservoir R and the fixed portion F. Initially, it should be observed that the base body P1 of the dispensing member P is arranged in the internal housing 10 of the support 1. Its inlet P2 is engaged in and the sealed connection endpiece 18. It should also be observed that the capsule 3 surrounds the ring 2, with the studs 33 engaged with the threads or camways 22: a rotation, preferably a clockwise rotation, causes the capsule 3 to descend around the ring 2. As a result, the neck seal 122 is compressed between the neck R2 and the plate 12, and the pump seal 121 is compressed between the plate 12 and the flange 31.

Thus, three seals are produced simultaneously. A first seal is produced at the level of the engagement of the inlet P2 in the sealed connection endpiece 18: it guarantees that the dispensing member P is fed solely through the dip tube D. This seal may be radial, as shown in FIG. 6*a*, or axial, as shown in FIG. 6*b*, where the sealed connection endpiece 18*a* is provided with a small O-ring 18*b*. A second seal is provided at the neck seal 122: it guarantees that the fluid product stored in the reservoir R cannot leak between the neck R2 and the support 1. A third seal is provided at the pump seal 121: it guarantees that the fluid product stored in the reservoir R cannot leak between the support 1 and the base body P1 of the dispensing member P. The internal housing 10 communicates with the reservoir R through the dip tube D, and also through the filling 15 and venting 16 windows.

Of course, the dispensing head T may be removed or separated from the first sub-assembly by unscrewing the capsule 3, for example by imparting an anticlockwise rotation to the ferrule 4. Once the dispensing head T has been removed, the internal housing 10 is wide open towards the outside: a user can then fill the reservoir R by pouring the fluid product into the internal housing 10, which communicates with the reservoir through the filling windows 15. Simultaneously, the air contained in the reservoir R escapes from there through the ventilation windows 16. The user may easily control the filling operation by observing the level of the fluid product inside the housing 10. Once filling has been completed, the dispensing head T can be replaced by screwing.

FIGS. 7*a*, 7*b* and 8 illustrate a second embodiment of the invention, which differs only in its support 1', which comprises two distinct portions, movable with respect to each other. This support 1' is integral, with the ring 2, of a fixed portion F'.

This support 1' comprises a first portion which is formed by a peripheral body 11', a plate 12, a skirt 13, a transition section 14' and a connection sleeve 17'. The plate 12 and the skirt 13 identical to those in the first embodiment. The body 11' is perforated with a plurality of windows 15', 16', while the transition section 14' is not perforated. The sleeve 17' extends inside the body 11 ': the dip tube D is engaged in the sleeve 17'.

This support 1' comprises a second portion 180 which forms a sealed connector endpiece 18', a piston 181 and a spring 182. The sealed connector endpiece 18' is similar or identical to that of the first embodiment. However, it is movable axially in the peripheral body 11' against the spring 182 which extends around the sleeve 17' and bears against the bottom of the transition section 14'. The piston extends around the sealed connector endpiece 18' and comes into either leaktight or non-leaktight contact with the inner wall of the peripheral body 11'. The sealed connection piece 18' and the piston 181 may thus slide in the peripheral body 11' between a retracted engaged position shown in FIG. 7*a* and an extended rest position shown in FIG. 7*b*. It should be observed that the piston 181 is located axially below the windows 15, 16 in FIG. 7*a* and above the windows 15, 16 in FIG. 7*b*. Communication between the reservoir and the outside through the windows 15, 16 is cut off in the extended rest position. Thus, the risk of spilling the fluid product contained in the reservoir is very greatly reduced, since it communicates only through the dip tube D. The portion 180 therefore fulfils a role of a shutter when the dispensing head T is removed. In addition, the spring 182 urges the sealed connection endpiece 18' against the inlet P2 of the dispensing member P, thereby improving the sealing between them. It is also possible to use the sliding of the sealed connection endpiece 18' to mount dispensing members P of different sizes or heights.

In FIG. 8, a filling source S has been mounted on the first sub-assembly instead of the dispensing head T. This source S comprises a source reservoir S1, a mounting ring S2 and a nozzle S3. The mounting ring S2 may be screwed onto the fastening ring 2 instead of the capsule 3. Once the screwing has been completed, the nozzle S3 has moved the sealed connection endpiece 18' into the retracted engaged position, as in FIG. 7*a*. The windows 15', 16' are open and the fluid product in the source reservoir S2 can flow by gravity into the reservoir R through one of the windows 15' or 16'. In order to impose the flows, the nozzle S3 comprises a short fluid product duct S4 and a long air duct S5, which extends into the source reservoir S2 through a funnel S6. The descending fluid product will pass through the short duct S4, while the ascending air will pass through the long duct S5.

Without going beyond the scope of the invention, it is possible to provide a one-piece support, the body and/or the transition section of which is elastically deformable by elongation. The body may, for example, be in the form of bellows with or without windows. In the rest position, the bellows may at least partially obstruct the windows. In addition, it is conceivable to make the reservoir and the fixed portion as a single piece: the transition section would be connected to the inner wall of the neck of the reservoir, while the threads or camways would be directly formed by the outer wall of the neck. The reservoir should then have an attached bottom. The screw-fastening/unscrewing connection may be replaced by any other removable connection, e.g., by magnets, snap-fasteners, etc.

The invention claimed is:

1. A refillable fluid product dispenser comprising:

a fluid product reservoir defining a neck;

a dispensing member that is mounted on the neck of the fluid product reservoir for taking up the fluid product, the dispensing member comprising an inlet;

a fastening member for fastening the dispenser member onto the neck of the fluid product reservoir;

a dip tube that is connected to the inlet of the dispensing member and extends into the fluid product reservoir;

the dip tube being secured to the fluid product reservoir by means of a support that forms at least one filling window communicating directly with the inside of the fluid product reservoir, the fastening member enabling withdrawal of the dispensing member, thus providing access to the support in order to fill the fluid product reservoir through said at least one filling window;

wherein the support is integrated in a fixed portion mounted on the fluid product reservoir and the dispensing member is integral with a movable portion removably mounted on the fixed portion; and wherein the fastening ring holds a pump seal on the support.

2. The dispenser according to claim 1, wherein the fixed portion comprises a fastening ring forming a first removable fastening means which co-operate with a second removable fastening means formed by the movable portion.

3. The dispenser according to claim 2, wherein the support forms a catching skirt engaging around the neck, the fastening ring locking the catching skirt around the neck.

4. A refillable fluid product dispenser comprising:

a fluid product reservoir defining a neck;

a dispensing member that is mounted on the neck of the fluid product reservoir for taking up the fluid product, the dispensing member comprising an inlet;

a fastening member for fastening the dispenser member onto the neck of the fluid product reservoir;

a dip tube that is connected to the inlet of the dispensing member and extends into the fluid product reservoir;

the dip tube being secured to the fluid product reservoir by means of a support that forms at least one filling window communicating directly with the inside of the fluid product reservoir, the fastening member enabling withdrawal of the dispensing member, thus providing access to the support in order to fill the fluid product reservoir through said at least one filling window;

wherein the support is integrated in a fixed portion mounted on the fluid product reservoir and the dispensing member is integral with a movable portion removably mounted on the fixed portion; and wherein the support comprises an annular support plate extending above the neck and supporting a pump seal.

5. The dispenser according to claim 4, wherein a neck seal is compressed between the annular support plate and the neck.

6. The dispenser according to claim 4, wherein the pump seal is held in place on the annular support plate by a fastening ring that extends around the neck.

7. The dispenser according to claim 6, wherein the fastening ring comprises an inwardly-directed rim that engages the outer periphery of the pump seal.

8. The dispenser according to claim 7, wherein the fastening ring forms a first removable fastening means which co-operate with a second removable fastening means formed by the movable portion.

9. The dispenser according to claim 7, wherein the fastening ring forms a first removable fastening means which co-operate with a second removable fastening means formed by the movable portion.

10. The dispenser according to claim 9, wherein said at least one filling window and said at least one vent window are located at a same axial height.

11. The dispenser according to claim 4, wherein said at least one filling window and at least one vent window are located at the same axial height.

12. The dispenser according to claim 1, wherein the support forms a sealed connection endpiece in which the inlet of the dispensing member is engaged, the dip tube being in fluid communication with the sealed connection endpiece.

13. The dispenser according to claim 12, wherein the sealed connector endpiece is movable between an extended rest position and a retracted engaged position, elastic means urging the sealed connection endpiece into the extended rest position, so that the sealed connector endpiece, in the retracted engaged position, is urged elastically against the inlet of the dispensing member, the filling window and/or the vent window having a flow section that is at its maximum in the retracted engaged position and at its minimum in the extended rest position.

14. The dispenser according to claim 13, wherein the support comprises a peripheral body in which the sealed connector endpiece slides against the elastic means.

15. The dispenser according to claim 1, wherein the support comprises a peripheral body, a transition section, a sealed connector endpiece and a connection sleeve, the peripheral body and/or the transition section forming the filling window and a vent window, the sealed connector endpiece receiving the inlet of the dispensing member and the connection sleeve receiving the dip tube.

16. The dispenser according to claim 1, wherein the dispensing member is a pump.

17. The dispenser according to claim 1, wherein the support comprises a vent window to allow air to escape from the fluid product reservoir when the fluid product reservoir is filled with fluid.

18. The dispenser according to claim 17, wherein the at least one filling window and the vent window are located at a same axial height.

* * * * *